United States Patent
Lynch et al.

(10) Patent No.: US 6,433,881 B1
(45) Date of Patent: Aug. 13, 2002

(54) METHOD OF ESTABLISHING A SET OF PRINT STREAM OBJECTS IN AN OBJECT ORIENTED ENVIRONMENT

(75) Inventors: John P. Lynch, Yorkville; Robert P. Williamson, Naperville, both of IL (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/223,304

(22) Filed: Dec. 30, 1998

(51) Int. Cl.$^7$ .............................................. G06K 15/00
(52) U.S. Cl. ...................... 358/1.13; 707/500; 707/900; 707/901
(58) Field of Search ................ 358/1.1–1.9, 1.11–1.18; 707/500, 500.1, 501.1, 502–542, 900–911

(56) References Cited

U.S. PATENT DOCUMENTS

| | | | |
|---|---|---|---|
| 4,970,554 A | 11/1990 | Rourke ........................ | 355/202 |
| 5,270,775 A | 12/1993 | Suzuki ......................... | 355/204 |
| 5,353,388 A | 10/1994 | Motoyama ................... | 395/117 |
| 5,383,129 A | 1/1995 | Farrell ..................... | 364/464.01 |
| 5,384,620 A | 1/1995 | Ebner et al. ................. | 355/202 |
| 5,423,043 A | 6/1995 | Fitzpatrick et al. .......... | 395/700 |
| 5,450,571 A | 9/1995 | Rosekrans et al. ........... | 395/500 |
| 5,467,434 A | 11/1995 | Hower et al. ................ | 395/114 |
| 5,475,801 A | 12/1995 | Brindle et al. ............... | 395/114 |
| 5,483,653 A | 1/1996 | Furman ........................ | 395/650 |
| 5,495,561 A * | 2/1996 | Holt ............................ | 358/1.15 |
| 5,499,369 A | 3/1996 | Atkinson ...................... | 395/650 |
| 5,506,661 A | 4/1996 | Kagaku ........................ | 355/209 |
| 5,528,734 A | 6/1996 | Sanchez ....................... | 395/115 |
| 5,566,278 A * | 10/1996 | Patel et al. .................. | 358/1.15 |
| 5,619,649 A | 4/1997 | Kovnat et al. ........... | 395/200.01 |
| 5,644,682 A | 7/1997 | Weinberger et al. ......... | 395/101 |
| 5,715,379 A | 2/1998 | Pavlovic et al. ............. | 395/112 |
| 5,760,775 A | 6/1998 | Sklut et al. .................. | 345/349 |
| 6,031,623 A * | 2/2000 | Smith et al. ................. | 358/1.14 |
| 6,173,295 B1 | 1/2001 | Goertz et al. ................ | 707/505 |
| RE37,258 E * | 7/2001 | Patel et al. .................. | 358/1.15 |

OTHER PUBLICATIONS

"Object–Oriented Modeling and Design", Prentice Hall, Englewood Cliffs, New Jersey.
"Copyright: The Java Tutorial", for the Internet, 1995 Sun Microsystem, Inc.

* cited by examiner

Primary Examiner—Gabriel Garcia
Assistant Examiner—King Y. Poon
(74) Attorney, Agent, or Firm—Ronald Reichman; Paul A. Levitsky; Angelo Chaclas

(57) ABSTRACT

The invention is a method for creating a print job object, in an object oriented development environment of a print stream processing system. The object creation function within the system is named which registers a class within the function and instantiates the class. The instantiation establishes a programming interface to the print job object which allows the establishment of the print job object properties. The object's programming interface creates a portal through which a set of object methods can be placed within the print job object. The methods include action instructions which further include: display instructions; storage instructions; and, printing instructions. Additionally device selection functionality, text formatting functionality which further includes text templates for the matching of the print stream to a set of desired document finishing schemes, and a set of print job data tables can be placed within the print job object by utilizing the programming interface. The set of print job data tables further includes a plurality of text field data; rules for use of text field data; error messages; and suggestions for alternate paths of movement within the print stream processing system. Creation of a human interface for allowing data to be displayed to a system operator under direction from the object methods, and placing of the human interface within the print job object, can also be accomplished by utilizing the programming interface.

7 Claims, 6 Drawing Sheets

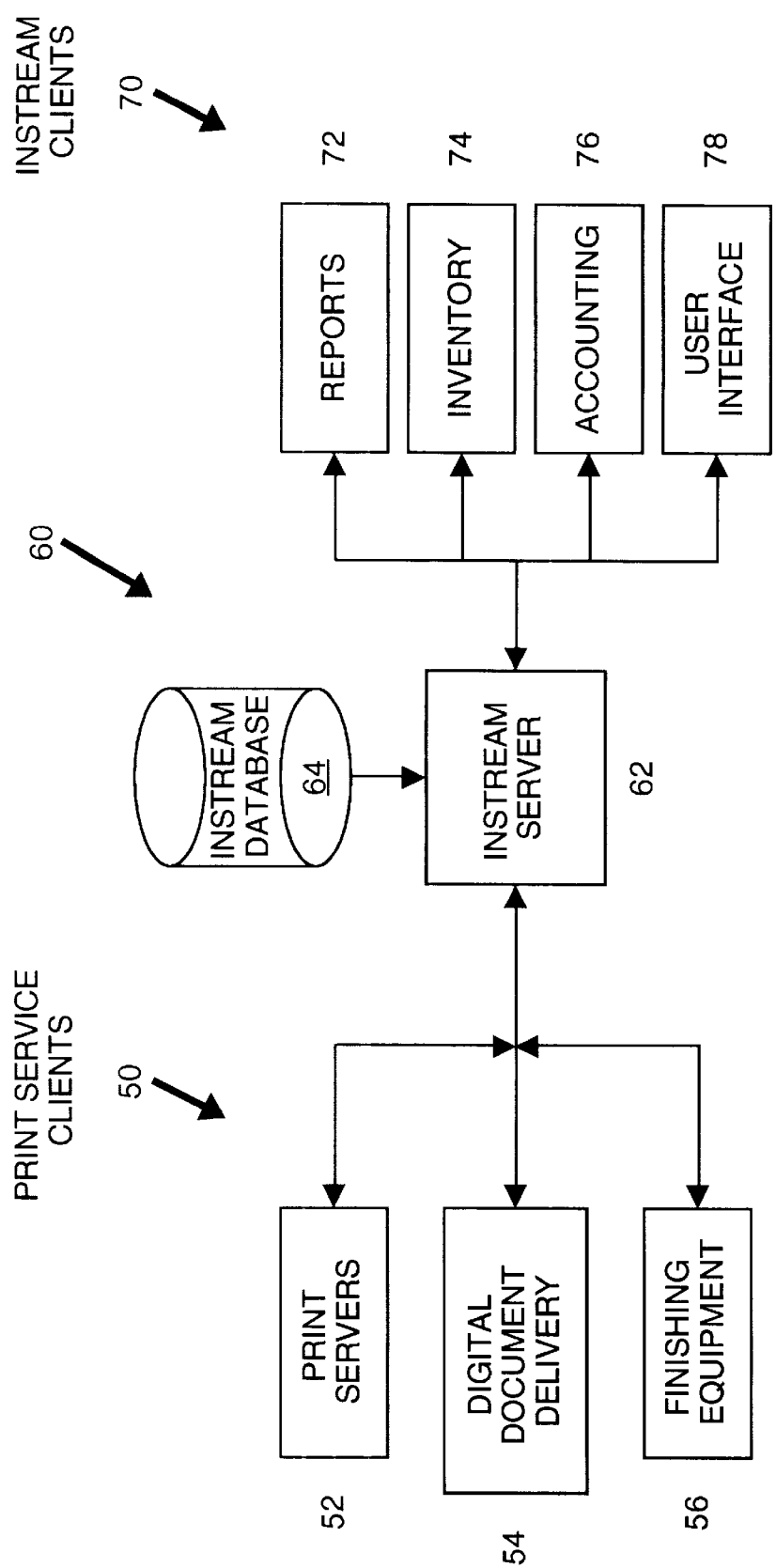

METHOD OF ESTABLISHING A SET OF PRINT STREAM OBJECTS IN AN OBJECT ORIENTED ENVIRONMENT

RELATED APPLICATIONS

Reference is made to application Ser. No. 09/222,745, entitled A METHOD AND SYSTEM FOR PRINT STREAM JOB DETERMINATION AND ANALYSIS, assigned to the assignee of this application and filed on even date herewith.

Reference is made to application Ser. No. 09/222,640, entitled A METHOD AND SYSTEM OF DETERMINING A JOB TICKET FOR A PRINT STREAM DETERMINING PROCESS, assigned to the assignee of this application and filed on even date herewith.

Reference is made to application Ser. No. 09/223,348, entitled MESSAGE STRUCTURE FOR A PRINT STREAM DETERMINING AND ANALYSIS SYSTEM, assigned to the assignee of this application and filed on even date herewith.

FIELD OF THE INVENTION

The general field of the invention is that of data processing, and, more specifically, print stream processing. In its most specific segmentation, the field is that of optimization of those devices directed to processing a print stream for the purpose of producing a plurality of mailpieces.

BACKGROUND OF THE INVENTION

As the capabilities of data processing systems has grown, so too have the requirements that are tasked to these systems. Greater speed has given rise to more detail oriented applications, greater memory capability has made memory intensive applications more attractive, and detailed applications have lead to more wide-spread use of previously inaccessible data processing abilities. With the spiraling growth in data processing ability, there has grown a need for more efficient ways of programming that promote speed as well as flexibility. Flexibility, in particular, allows applications that have been designed in varied programming languages, or operating on different platforms to be able to communicate without extensive system or file modification.

Once such means of promoting flexibility within a data processing system is in the use of "object-oriented" design (OOD). Object oriented programming languages are useful in removing some of the restrictions that have hampered application design due to the inflexibility of traditional programming languages.

OOD utilizes a basic element or construct known as the "object.," which combines both a data structure and an intended behavior characteristic within the single element. Thus, software applications become an organized collection of discrete objects in which data is held or moved based on the intended behavior of an object which is inherently unique. Each object knows how to perform some activity. Objects can be specific or conceptual. But, to be of value to a particular application, objects must be able to be referenced.

Referencing is accomplished through indexing, addressing, or through value assignment which can be placed in a table for use as required. Objects can also be arranged by classification. Classification is based on groupings of objects based upon properties or characteristics important to an application or requirement. Each class describes a potentially infinite set of objects that comprise that class.

OOD is known in the software arts and specific discussion of application design based upon OOD is not required for a thorough understanding of the applicant's claimed invention.

In the past several years, significant changes have occurred in the operation of high volume document production centers. These centers have merged traditional printing capabilities with mailroom production facilities. Executives tasked with the management of both print and mail operations are expected to play an ever-growing role in the creation and design of document centers that will deliver effective, high quality, and high integrity output. The current development and emphasis on these centers in corporations or regional centers has lead to the growing use of the term "Automated Document Factory" (hereinafter "ADF") to describe consolidated printing and mail finishing operations.

In current practice, large mailing companies tend to separate the process of creating documents from the process of manufacturing documents (mailpieces). The print center tasked with finishing the created document receives both scheduled and scheduled print jobs with a wide range of requirements. These print jobs are evaluated, scheduled, and executed in the printfinish center.

Because the print/finish center has traditionally been "information systems poor," most of the work required to prepare or "condition" the print job for manufacturing was created in the business unit or print service client. Typical conditioning processes include: performing postal address hygiene; adding PostNet™ barcodes; presorting mailings; adding inserter barcode instructions; adjusting printer paper size and orientation; and, adding spot color instructions.

The manager of such a print/finish operation, seeking to maximize efficiency through optimal use of equipment and decision making tools, is faced with a dilemma. First, the decisions about the structure and management of the print/finish center are generally made outside of the center; the decisions are generally made by the Information Systems (IS) group creating the print job and its associated print stream. Document manufacturing requests are also assigned lower priorities, further limiting management control. Second, the hardware systems and their associated peripheral devices are often sourced from different manufacturers so that the printers and inserters being fed by the print stream are relying on differing motivators from the print stream.

To help classify and organize the concept of the emerging print/finish center, an architecture has been developed within the print stream industry that is referred to as the ADF. The Automated Document Factory™ architecture proposed by the Gartner Group of Stamford, Connecticut, provides a model for a set of processes that prepares and positions enterprises to manage the creation and delivery of high-volume digitized documents by using factory production techniques that appropriately and optimally mechanize document production. The raw materials of production (i.e., the document data and preparation instructions), enter the ADF which transforms them into digital documents and prepares them for delivery.

The architecture for the ADF is comprised of four (4) modules; these include: input; transformation; delivery and preparation; and, control and reporting. Each module, or building block, is made up of other modules and each is connected by a series of interfaces, or links.

Each of the building blocks must be linked through effective communication which includes the tracking and measurement of the input and output of the document manufacturing hardware and associated peripherals. To enhance productivity and cost-effectiveness of the overall system, systems managers need to be able to scrutinize every element of the print job process to see where improvements can be made. Thus, each of the modules takes on an increased significance when viewed with respect to their relationship with the overall system.

There is thus a need to provide each of the modules for the ADF so that the structure can be self supporting and viable. The input module is where all of the data and instructions needed to transform the arriving print stream data into documents enters the ADF. The present invention is currently being introduced to the print stream market by the assignee of the present invention, Pitney Bowes Inc. of Stamford, Conn., as the InStream™ server which is designed as the input module for the ADF.

It is an object of the present invention to provide the input module to the conceptual ADF frame by describing herein an open systems, client-server technology for facilitating automated document manufacturing techniques.

The use of object oriented design to facilitate object oriented linking of diverse applications, is a distinct benefit when employed within data processing systems such as print stream client/server systems with diverse device driver applications. Therefore, it is an object of the present invention to provide for an object oriented method and system of interfacing between print stream creation applications that are based on differing program languages or exist on differing operating system platforms and a document manufacturing system.

It is a further object of the present invention to provide a method of optimizing the use of hardware and associated peripheral devices in manufacturing documents that have been digitally delivered through the input module. Additionally, it is further object of the present invention to measure the activities of each of the hardware and peripheral components so that accurate reporting can be made so as to facilitate subsequent job performance decisions and so as to maximize system utility and performance.

SUMMARY OF THE INVENTION

According to the invention, the above objects are achieved and the disadvantages of the prior art are overcome by a method for creating a print job object, in an object oriented development environment of a print stream processing system. There are two alternatives for object creation as defined herein; the selection of one over the other is dependent upon the object legacy.

In a preferred embodiment of the object creation method, an object creation function within the print stream processing system is initiated. The initiated function registers a class within the object creation function and names (instantiates) the class. The instantiation establishes a programming interface to the print job object which allows the establishment of the print job object properties.

The object's programming interface creates a portal through which a set of object methods can be placed within the print job object. The set of object methods comprises action instructions which further comprise: display instructions for instructing the print stream processing system to display data on the display means; storage instructions for instructing the print stream processing system to store data; and, printing instructions for instructing the print stream processing system to print data on the output means.

Additionally, device selection functionality, text formatting functionality, and a set of print job data tables can be placed within the print job object by utilizing the programming interface. The device selection functionality further comprises: a table of required output devices; a table of available output devices; and, matching rules for matching the table of required output devices to the table of available output devices. The device selection functionality comprises lookup means for looking up an interface between the print stream and a driver for the output device; the lookup based upon a comparison of a requested device identifier and an available device identifier. Text formatting functionality further comprises text templates for the matching of the print stream to a set of desired document finishing schemes, and one or more sets of instructions for creating text sub-fields, wherein each of the sub-fields corresponds to a selected text format.

The set of print job data tables further comprises: a plurality of text field data; rules for use of text field data; error messages; and suggestions for alternate paths of movement within the print stream processing system. Creation of a human interface for allowing data to be displayed to a system operator under direction from the object methods, and placing of the human interface within the print job object, can also be accomplished by utilizing the programming interface.

An alternative method of creating the print job object begins with the location of a job template in the print stream client server. The job template is copied to create a new job object instance. The copied job template has a set of job properties embedded in the new job object instance; these are augmented with a second set of job object properties to establish a new job object. The new job object is then saved to a database of the print stream client server by utilizing a database engine of the print stream client server to store the new job object.

Utilization of the print job object begins with the creation of a document within the print stream processing application and then determining that the processing of the print stream is required at a remote location for document finishing. The print stream is transmitted, under control of the server, to the remote location; and, then the print job object is invoked at the server, whereby the print job object performs finishing device selection and text formatting at the remote location.

BRIEF DESCRIPTION OF THE DRAWINGS

FIG. 1B is a block diagram of the system of the present invention and is shown as three (3) subsystems.

DETAILED DESCRIPTION OF THE PREFERRED EMBODIMENTS

Figure 1A:
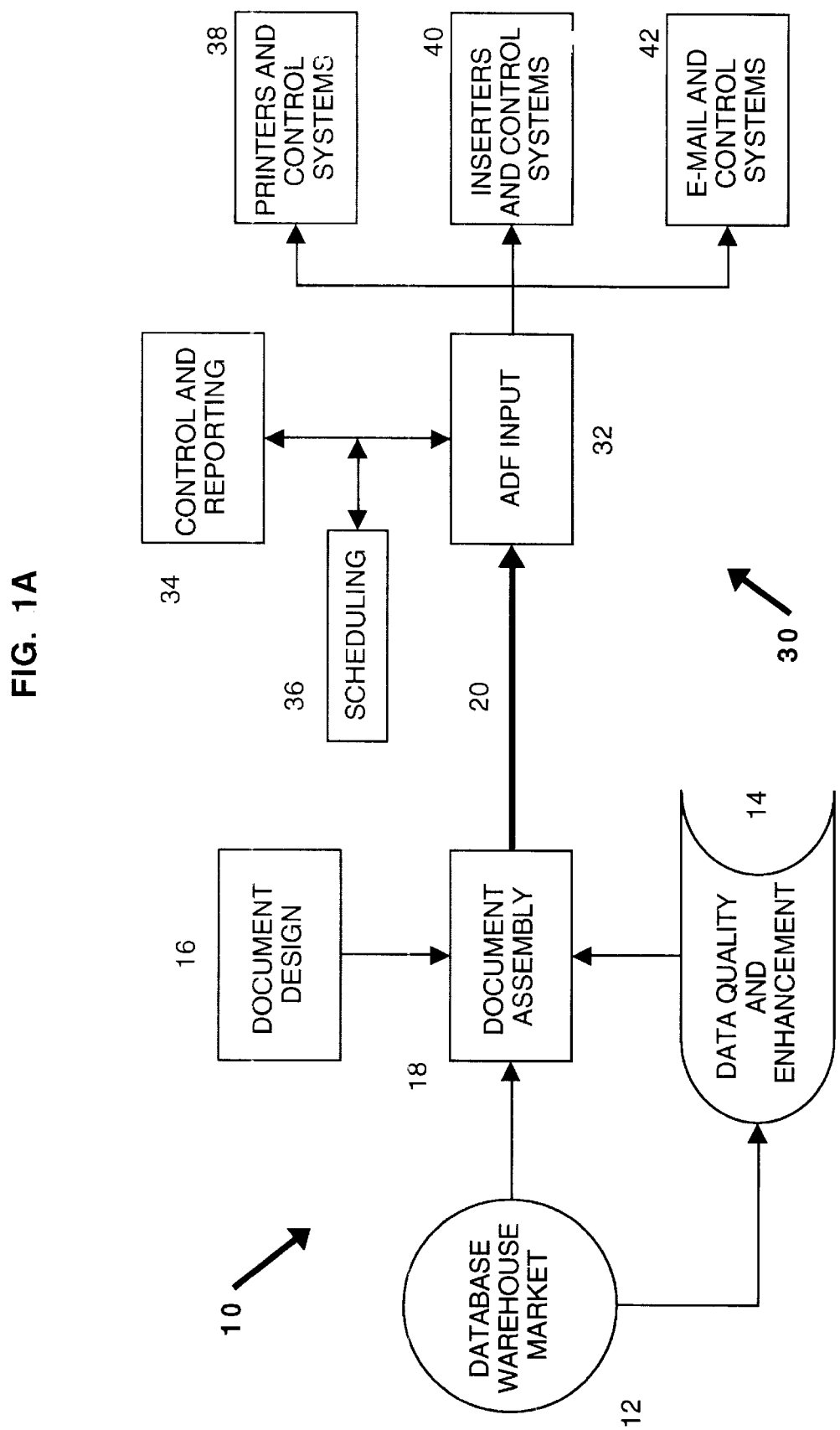
FIG. 1A is an upper level block diagram of a host system which is capable of supporting the method of the present invention.

FIG. 1A is an upper level block diagram of a host system which is capable of providing input to, and supporting, the method of the present invention while further providing output paths.

The system is divided into two subsystems; these are designated as document creation 10 and document manufacturer 30 which will also be referred to as the Automated Document Factory or ADF.

Document creation 10 includes a database warehouse market 12 which provides one or more data streams to be incorporated within the document assembly at document assembly station 18. The data streams are sourced from one or more databases contained within the database warehouse market 12 at the request of a document assembly routine within document assembly 18. The data may pass directly to document assembly 18 or may first pass through data quality and enhancement routine 14. Data quality and enhancement routine 14 processes data so as to prepare it for the requirements of the document assembly routine. If the document assembly routine does not require quality or enhancement processing, then the data would pass directly from the database warehouse market 12 to document assembly 18.

Document assembly 18 prepares a digital document and transmits the document to an ADF via a digital document transmission 20 known as a print stream. The ADF subsystem is shown in FIG. 1A as document manufacturer 30.

Document manufacturer 30 receives the digital document transmission 20 at the ADF input 32 and assigns a job ticket to the stream which is indicative of the print parameters associated with the print stream. ADF input 32 will re-direct the stream in accordance with the job ticket to various peripheral devices for printing and/or various output paths for re-transmission or data storage. The peripheral devices and output paths include: printers and their associated control systems 38; inserters and their associated control systems 40; and, E-mail and transmission control systems 42. It should be noted that the current invention is not limited to the embodiment shown, but may include any print stream finishing device such as console print stream finishers, storage devices for re-transmission, or interim data quality and enhancement routines for processing the print stream.

As ADF input 32 processes and directs the print stream, it will constantly monitor the forces acting on the print stream through control and reporting routines 34; these routines will in turn interface with scheduling module 36 to promote efficiency in current or subsequent print stream processing.

Turning to FIG. 1B there is shown a block diagram of the system of the present invention which is further broken down into three (3) subsystems designated as print service clients 50, InStream server system 60, and InStream clients 70.

Print service clients 50 is comprised of: print servers 52 which are receiving one or more print streams from InStream server 62 and reporting back statistical or process data which can be used by InStream clients 70 to manage the document creation process; digital document delivery systems 54 which enable high-volume mail producers to utilize existing legacy-generated print streams, and the images they contain, to further access internet billing and bill presentment applications; and, finishing equipment 56 for actually producing the document defined by the print stream.

Print service clients 50 communicate with InStream server system 60 via TCP/IP sockets. TCP/IP sockets are known to those skilled in the art and do not require further detail or explanation to fully appreciate and understand the present invention.

InStream server system 60 comprises InStream server 62 and InStream database 64. In one embodiment of the present invention, InStream server 62 is a multi-threaded, concurrent server running on the Win32™ platform (available from Microsoft Corporation of Redmond, Wash.). InStream server 62 is implemented in the Java™ programming language (available from Sun Microsystems, Inc. of Palo Alto, Calif.) and is therefore not necessarily restricted to the Win32 platform. Database access is provided via the Microsoft SQL™ server.

InStream clients 70 further comprises: reports 72 for producing print stream and finishing reports that can be used to monitor the system, determine optimal peripheral and system efficiencies or detail production; inventory 74 for monitoring system-wide capacity; accounting 76 for monitoring time and expense for sub-routines or document production activities; and, user interface 78 for monitoring of client activities.

Figure 2:
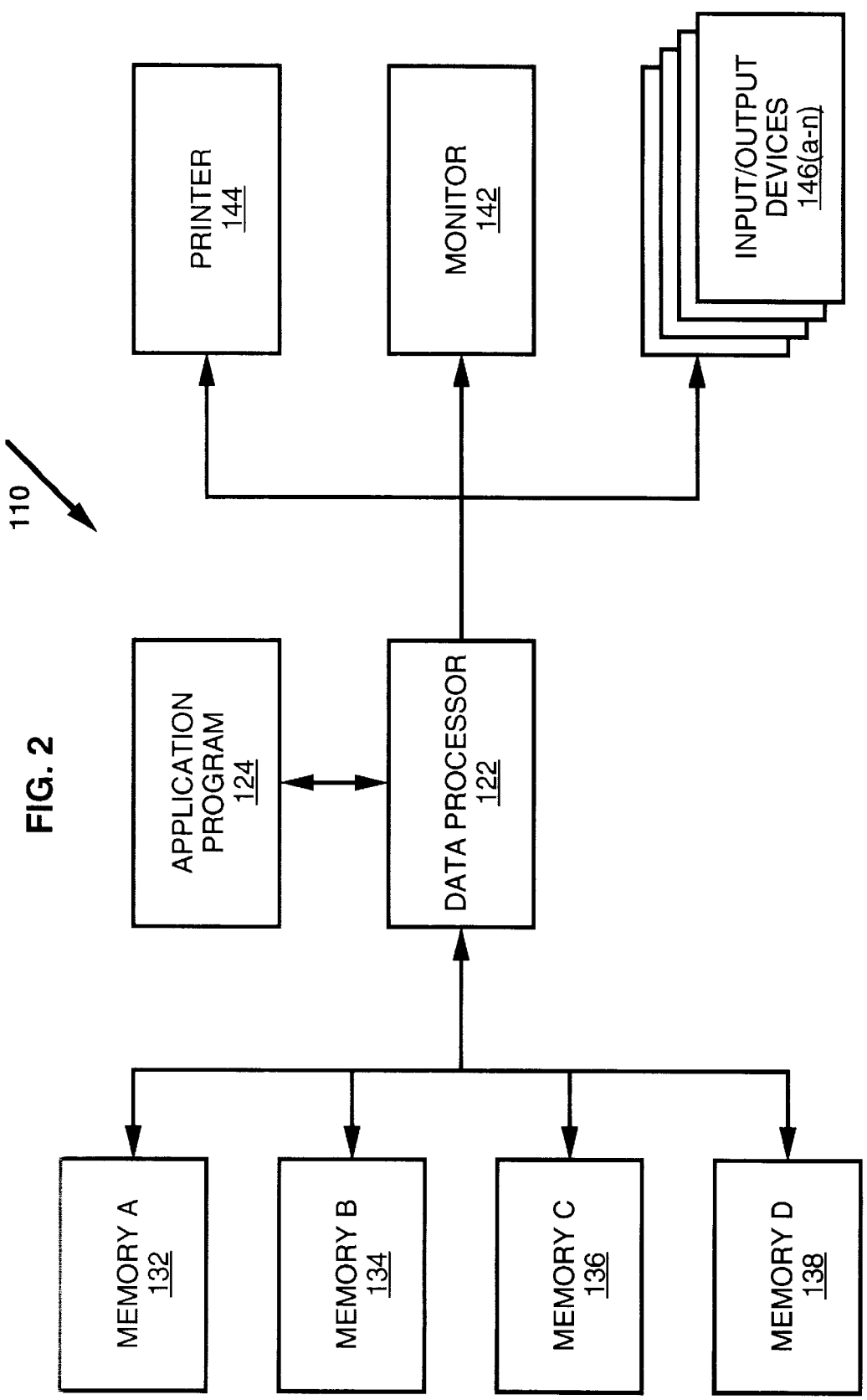
FIG. 2 is a block diagram of a data processing system which is representative of a system which could act as host to the invention's method.

Now turning to FIG. 2 there is shown a block diagram of a data processing system which is representative of a system which could act as host to the invention's method.

The ADF server is represented by data processing system 110 which is based on data processor 122. Data processor 122 is a central processing unit (CPU) of a computer (such as a personal computer (PC), a mid-frame (IBM AS/400), or main frame) and its associated RAM or other memory, operating system software, and application systems which are capable of performing basic print stream processing functions (such as SmartMailer® which is available from Pitney Bowes Inc. of Stamford, Conn.) or more advanced print stream processing (such as StreamWeaver® which is available from Pitney Bowes Inc. of Stamford, Conn.). The base components of the data processor 122 are known in the art and do not require a detailed description herein for an understanding of their utility and application.

Interoperatively connected to data processor 122 is the application program 124 which is the basis for the present application. Additionally, connected to data processor 122 are memory cells 132, 134, 136, and 138 which are utilized for saving various data streams being processed by the application program 124. The multiple memory means of the system may be located independently of each other, or may exist in co-located combinations. Varied memory means are contemplated wherein the memory may exist in the form of a PROM chip, PROM card, magnetic media, or other commercially available forms. The system layout, with respect to the memory, is at the convenience of the system designer. Further coupled to data processor 122, is printer 144 for document or print stream data output, monitor 142 which allows a system operator to view transactions occurring within the application program 24, and various input/output devices 146(a–n). Input and output devices 146(a–n), such as a keyboard for data input, or a modem for data transmission or reception can be interoperatively connected or interfaced to data processor 122 as appropriate.

Figure 3:
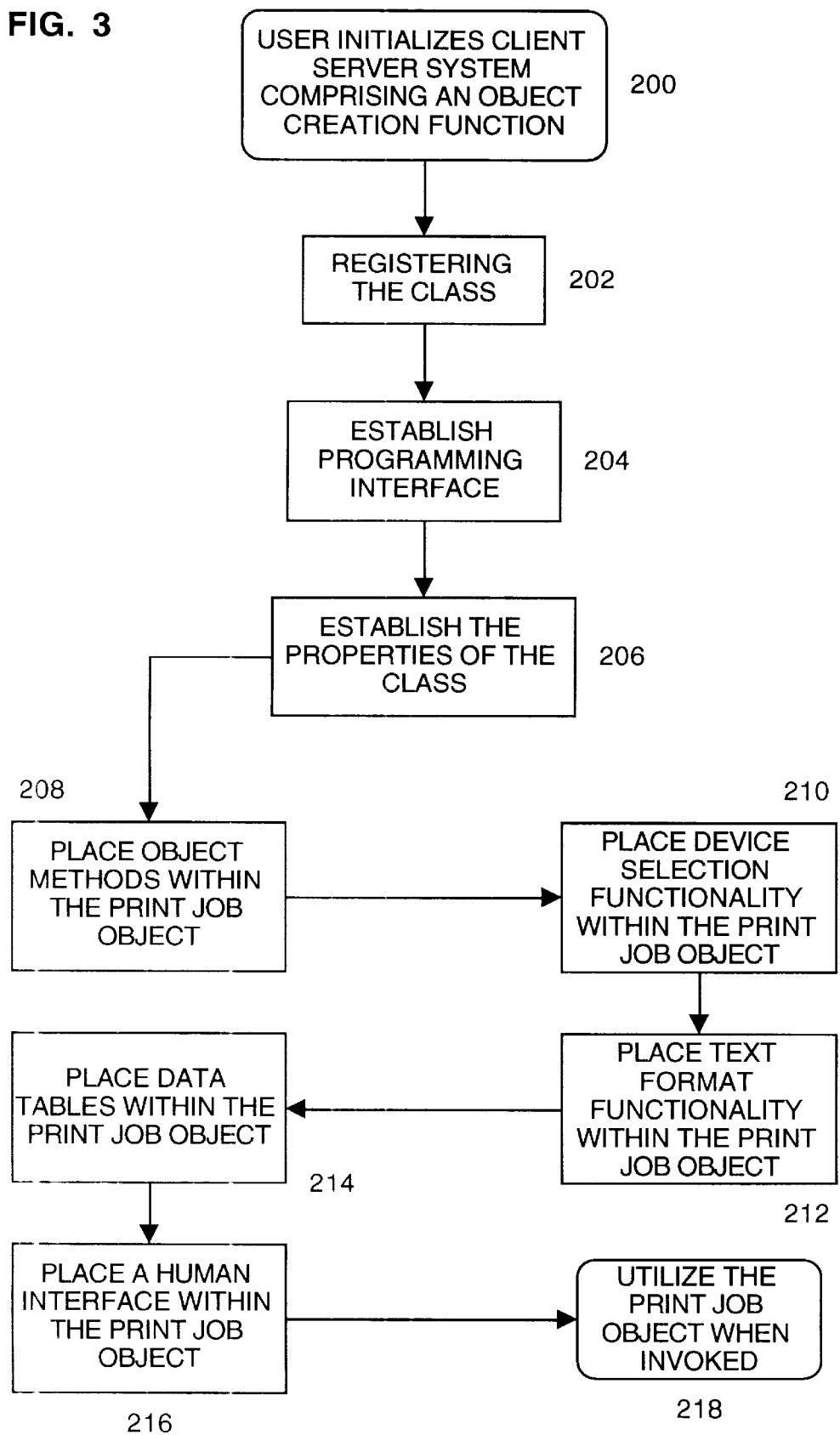
FIG. 3 is a detailed flowchart of the method of creating a print job object, from initial establishment, for use within a client server system of a print stream management system.

Turning to FIG. 3, there is shown a flowchart of the method utilized to create the print job object 300. A detailed discussion of object oriented programming is not required for a full understanding of the method described hereunder.

The creation of the print job object 300 begins at step 200 when a system user initializes a data processing system which has an object creation functionality resident therein. From step 200, the method advances to step 202 where the method instantiates a print job object by registering an object class with the object creation functionality. Registration of the class creates, at step 204, a programming interface that will be used as a port of entry into the object. The port of entry will allow the system to place class properties within the object. The system user will determine the properties of the class at step 206. The specific properties of the print job object are discussed in the description of FIG. 5.

From step 206, the method advances to step 208 where object methods are placed within the print job object by entering them through the programming interface. The method then advances to step 210 where finishing device selection functionality is placed within the print job object by entering it through the programming interface. In succession, text format functionality, data tables, and a human interface are placed within the print job object by entering them through the programming interface in steps 212, 214, and 216 respectively. It should be noted that steps 208 through 216 can be performed in any order so long as each of the step actions are performed prior to utilization of the object.

When the properties of the address object 300 have been placed into the object, the method advances to step 218 where the print job object can be utilized for its intended purpose when invoked. The use of the print job object 300 reduces the steps necessary to apply print stream manipulation functionality and is thus a significant improvement over the prior art.

Figure 4:
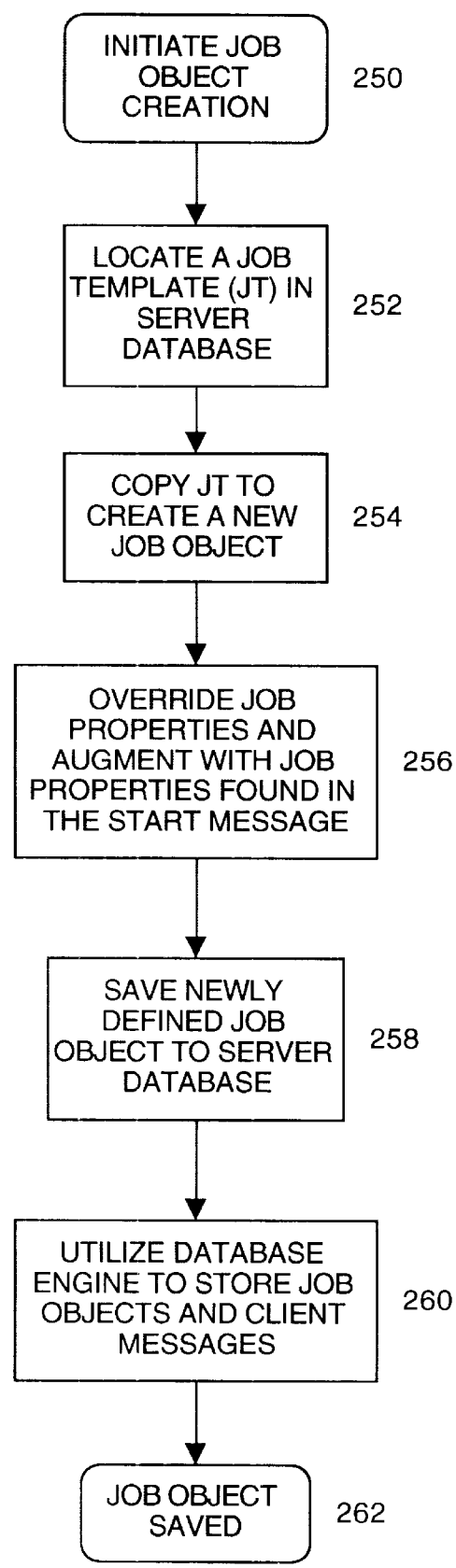
FIG. 4 is a detailed flowchart of the method of creating a print job object, from an existing job template, for use within a client server system of a print stream management system.

Turning to FIG. 4, there is shown a detailed flowchart of the method of creating a print job object, from an existing job template, for use within a client server system of a print stream management system.

While FIG. 3 details the creation of print job object 300 when first establishing the database of the server, FIG. 4 details the creation of the print job object from a legacy established in the database. The method begins with initiation of the legacy based job object creation routine at step 250. From step 250, the method advances to step 252 where a job template (JT) is located in the server database. The job template is copied, at step 254, to create a new job object instance of the template.

From step 254, the method advances to step 256 where the server over-rides the job properties embedded in the new job object; these are augmented with a new set of job properties which are found in the START message of the initiation step 250. The augmentation of the print job object with a new set of properties creates a new print job object which is saved, at step 258, to the server database. The method then advances to step 260, where the server utilizes the database engine to store, at step 262, the new print job object and any saved messages in one of the system memories dedicated to the database object storage routines.

Figure 5:
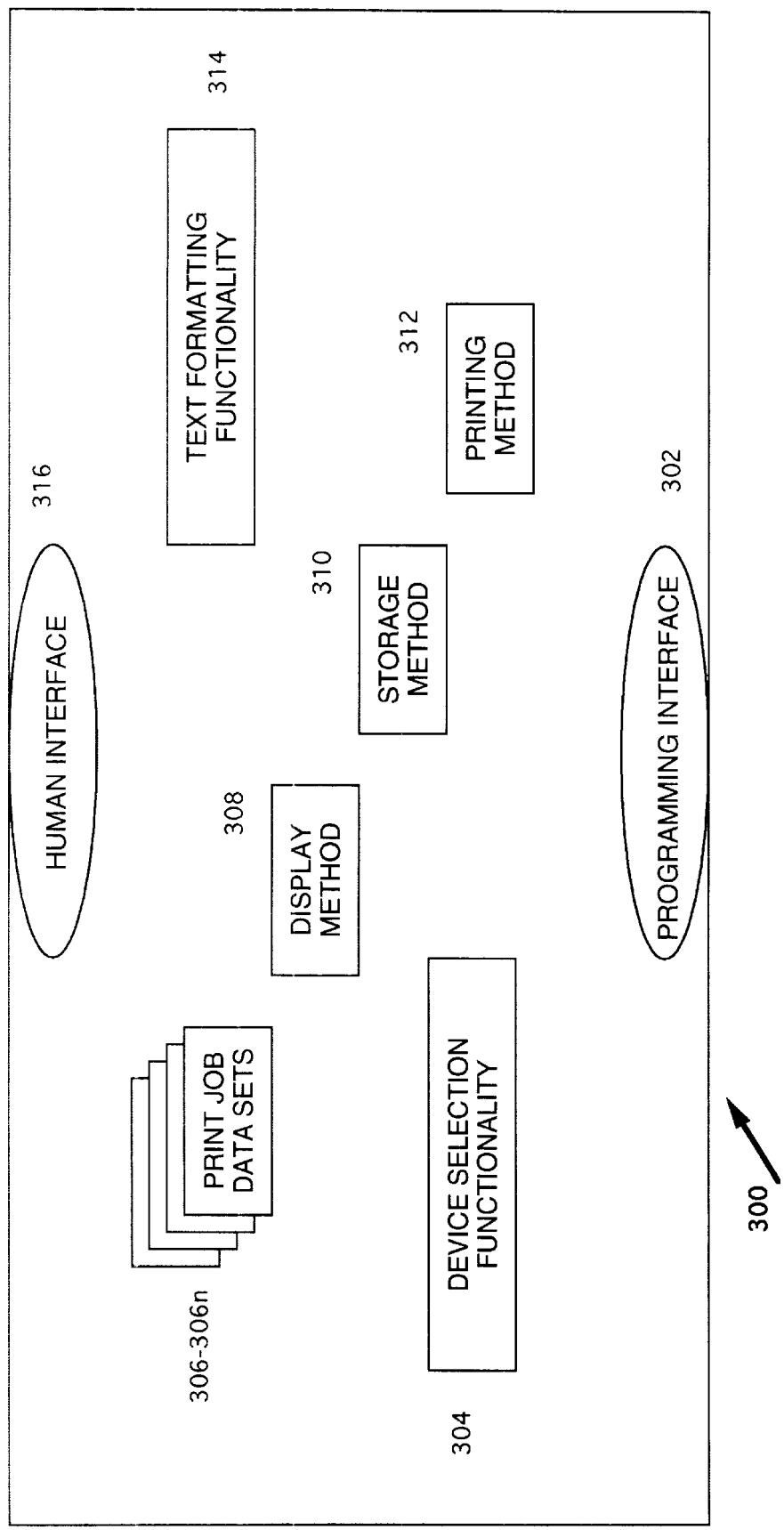
FIG. 5 is a block diagram of a print job object.

Turning to FIG. 5, there is shown a block diagram of the print job object 300 and its constituent sub-elements.

The print job object 300 contains a programming interface 302 which serves as the portal by which properties of the print job object 300 can be entered into it. The programming interface 302 is returned by the print stream processing server when the print job object 300 is instantiated, thus allowing the print job object 300 to be invoked as needed.

In applications such as Visual Basic, an object oriented designer would use a command such as "create object" to instantiate the object. The "createobject" command returns a programming interface such as "interface._" which will allow the designer to place the necessary properties into the object by entering their file name after the interface command.

The print job object 300 has specific requirements; therefore, through the programming interface 302 will come: a human interface 316; device selection functionality 304; text formatting functionality 314; a set of print job data tables 306–306n; and, a set of methods comprising display method 308, storage method 310, and printing method 312. Each of these elements is described in more detail hereinbelow.

Human interface 316 allows print job object 300 to provide a visual interface to the system user; additionally, printing methods 312 as contained in print job object 300 cause human interface 316 to direct a printer, such as document printer 38, to print data under the direction of the object. Thus, the purpose of human interface 316 is to provide the path for user interface functionality.

Additional functionality for print job object 300 is provided by device selection functionality 304 and text formatting functionality 314. Each of these performs a unique role. Device selection functionality 304 includes interface capability for interfacing the print stream selection functionality with the device drivers called out in the print instruction sets. Device selection functionality 304 further includes lookup instructions for looking up a device driver interfaces within a set of coding tables. Text formatting functionality 314, on the other hand, provides for document reconstruction and rules for the finishing of the document when under control of the individual device drivers. Additionally, text formatting functionality 314 allows print job object 300 to distinguish text format from color codes necessary to drive certain printers or monitors receiving the print stream.

Print job data tables 306–306n provide much of the data utilized by the print job object 300. Print job tables 306–306n include a number of fields from which an optimal data field will be constructed by print job object 300; these further include: a choice of fonts; rules for use of print job data; error messages; and suggestions for alternate paths of movement within data processing system 110.

Paths of movement are further dictated by print job object 300 through the use of its distinct method elements. Display method 308 is used for instructing the data processing system to display data on monitor 142. Storage method 310 is used for maintaining instructions for the data processing system to store data in its associated memory 132, 134, 136, and 138, or within a peripheral device. Printing method 312 is used for instructing the data processing system to print data on output means such as document printer 144, or a separate text printer 146.

While certain embodiments have been described above in terms of the system within which the InStream server may reside, the invention is not limited to such a context. The system shown in FIGS. 1A, 1B, and 2 are an example of a host system for the invention, and the system elements are intended merely to exemplify the type of peripherals and software components that can be used with the invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of creating a print job object, in an object oriented development environment of a print stream processing system, comprising the steps of:
   (a) establishing an object creation function within said print stream processing system;
   (b) registering a class within said data object creation function and instantiating said class; and, wherein said instantiation establishes a programming interface to said print job object;

(c) establishing the properties of said print job object by:
   (i) placing a set of object methods within said print job object by utilizing said programming interface;
   (ii) placing device selection functionality within said print job object by utilizing said programming interface;
   (iii) placing text formatting functionality within said print job object by utilizing said programming interface;
   (iv) placing a set of print job data tables that comprise:
   (A) a plurality of text field data;
   (B) rules for use of text field data;
   (C) error messages; and
   (D) suggestions for alternate paths of movement within said print stream processing system within said print job object by utilizing said programming interface; and (d) creating a human interface, for allowing data to be displayed to a system operator under direction from said object methods, and placing said human interface within said print job object by utilizing said programming interface.

2. The method of claim 1, wherein said set of object methods comprises action instructions; said action instructions further comprising display instructions for instructing said print stream processing system to display data on a display means.

3. The method of claim 1, wherein said set of object methods comprises action instructions; said action instructions further comprising storage instructions for instructing said print stream processing system to store data.

4. The method of claim 1 wherein said set of object methods comprises action instructions; said action instructions further comprising printing instructions for instructing said print stream processing system to print data on an output means.

5. The method of claim 1, wherein said device selection functionality further comprises:
   (a) a table of required output devices;
   (b) a table of available output devices; and
   (c) matching rules for matching said table of required output devices to said table of available output devices.

6. The method of claim 5, wherein said device selection functionality comprises lookup means for looking up an interface between said print stream and a driver for said output device; said lookup based upon a comparison of a requested device identifier and an available device identifier.

7. The method of claim 1, wherein said text formatting functionality further comprises:
   (a) text templates for the matching of said print stream to a set of desired document finishing schemes; and
   (b) one or more sets of instructions for creating text sub-fields, wherein each of said sub-fields corresponds to a selected text format.

* * * * *